(12) United States Patent
Marui

(10) Patent No.: US 6,643,749 B2
(45) Date of Patent: Nov. 4, 2003

(54) INTERFACE FOR MULTI-PROCESSOR

(75) Inventor: Shinichi Marui, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 186 days.

(21) Appl. No.: 09/985,285

(22) Filed: Nov. 2, 2001

(65) Prior Publication Data

US 2002/0056029 A1 May 9, 2002

(30) Foreign Application Priority Data

Nov. 6, 2000 (JP) .................................. 2000-337094

(51) Int. Cl.$^7$ .............................................. G06F 12/00
(52) U.S. Cl. ........................ 711/154; 711/147; 711/165
(58) Field of Search ................................. 711/147, 154, 711/165

(56) References Cited

U.S. PATENT DOCUMENTS

| 5,644,749 A | 7/1997 | Obayashi ............... 711/220 |
| 6,212,620 B1 * | 4/2001 | Kawasaki et al. ............. 712/32 |
| 2002/0018394 A1 * | 2/2002 | Takahashi ................. 365/233 |

FOREIGN PATENT DOCUMENTS

| EP | 0 345 738 | 12/1989 |
| EP | 0 502 214 | 9/1992 |
| JP | 5-307652 | 11/1993 |

OTHER PUBLICATIONS

TMS320C5$_x$ User's Guide, Chapter 6.4, Texas Instruments Inc., Jan. 1993.

* cited by examiner

*Primary Examiner*—Reba I. Elmore
(74) *Attorney, Agent, or Firm*—McDermott, Will & Emery

(57) ABSTRACT

Each of processors has an input/output port provided with a data terminal for transmitting and receiving address information and data to be transferred, a mode terminal for transmitting and receiving a mode signal indicative of whether a signal at the data terminal represents the address information or the data to be transmitted, a read/write terminal for transmitting and receiving a read/write signal indicative of a timing for each of the signal at the data terminal and a signal at the mode terminal, an input buffer and an output buffer each connected to the data terminal, a data memory pointer connected to the internal data memory, and a control circuit connected to the mode terminal and to the read/write terminal.

11 Claims, 16 Drawing Sheets

FIG. 4

| IM/S | XR/W | XMD |
|---|---|---|
| 0 | INPUT | INPUT |
| 1 | OUTPUT | OUTPUT |

FIG. 5

| IDIR | XDATA |
|---|---|
| 0 | INPUT |
| 1 | OUTPUT |

FIG. 7

| IM/S | MULTIPLEXER 1600 | MULTIPLEXER 1700 |
|---|---|---|
| 0 | R/W | MD |
| 1 | PR/W | PMD |

FIG. 10

| IMD (2 BITS) | | initial (0, 0) | start address (0, 1) | end address (1, 0) | normal (1, 1) |
|---|---|---|---|---|---|
| IPINC | | ○ | ○ | — | ○ |
| IDIR=1 | IMRD | ○ | — | — | ○ |
| | IRDHLD | — | — | — | ○ |
| IDIR=0 | ISAHLD | — | ○ | — | — |
| | IEAHLD | — | — | ○ | — |

○: PULSE IS GENERATED IN SYNCHRONIZATION WITH RISING OF IR/W

—: NO CHANGE

| IMD[1] | IMD[0] | OPERATION | MULTIPLEXER 2100 |
|---|---|---|---|
| 0 | 0 | initial | — — |
| 0 | 1 | start address | TXSR |
| 1 | 0 | end address | TXER |
| 1 | 1 | normal | TXMR |

| IMD[1] | IMD[0] | OPERATION | MULTIPLEXER 3100 |
|---|---|---|---|
| 0 | 0 | initial | – – |
| 0 | 1 | start address | RXSR |
| 1 | 0 | end address | RXER |
| 1 | 1 | normal | RXMR |

| IMD[1] | IMD[0] | OPERATION | MULTIPLEXER 4100 |
|--------|--------|-----------|------------------|
| 0 | 0 | initial | SA |
| 0 | 1 | start address | EA |
| 1 | 0 | end address | (DP)+1 |
| 1 | 1 | normal | (DP)+1 |

INTERFACE FOR MULTI-PROCESSOR

BACKGROUND OF THE INVENTION

The present invention relates to a technology for interfacing processors which is suitable for a multi-processor system.

A multi-processor is effective in a system in which a single processor is severely lacking in processing ability, e.g., in a large-scale digital signal processing system. In particular, a tightly coupled multi-processor is well known. The tightly coupled multi-processor in which a single address space is shared by a plurality of processors is also termed a shared memory multi-processor (See TMS320C5x User's Guide, Chapter 6.4, Texas Instruments Inc., Jan. 1993).

An interface for the shared memory multiprocessor requires arbitration logic for arbitrating between memory access requests issued from the individual processors. Even if the individual processors constituting the multi-processor are improved in performance, the problem is encountered that an inefficient interface inhibits an improvement in the performance of the entire system.

In a multi-processor using a system in which processed data is passed between the individual processors with the flow of digital signal processing, it is desirable to directly connect the individual processors under a constraint on the area of a printed circuit board.

SUMMARY OF THE INVENTION

It is therefore an object of the present invention to provide an interface for a multi-processor which enables efficient data transmission between processors.

To attain the object, the present invention has accomplished efficient data transmission between the processors by using the technology of message passing including the passing of address information for an internal data memory or a local memory. A memory access is in the form of block transfer performed by, e.g., specifying a start address and an end address.

Specifically, an interface for a multi-processor according to the present invention is an interface provided for each of a plurality of processors each having an internal data memory and connected to each other to constitute a multi-processor, the interface comprising: a data terminal for transmitting and receiving address information and data to be transferred; a mode terminal for transmitting and receiving a mode signal indicative of whether a signal at the data terminal represents the address information or the data to be transmitted; a read/write terminal for transmitting and receiving a read/write signal indicative of a timing for each of the signal at the data terminal and a signal at the mode terminal; an input buffer and an output buffer each connected to the data terminal; a data memory pointer connected to the internal data memory; and a control circuit connected to the mode terminal and to the read/write terminal. For data transmission, the control circuit performs a control operation of: directing the data memory pointer to generate a read address to be given to the internal data memory based on address information for the internal data memory of an objective processor out of the plurality of processors, the address information being held in the input buffer, thereby reading data from the internal data memory, and directing the output buffer to hold the data that has been read; transmitting, in conjunction with the mode signal and in synchronization with the read/write signal, address information for the internal data memory of a cooperative processor out of the plurality of processors which information is held in the output buffer to the cooperative processor via the data terminal; and transmitting, in conjunction with the mode signal and in synchronization with the read/write signal, the data held in the output buffer to the cooperative processor via the data terminal. For data reception, the control circuit performs a control operation of: receiving, in conjunction with the mode signal and in synchronization with the read/write signal, address information transmitted from the cooperative processor via the data terminal and directing the input buffer to hold the address information that has been received; receiving, in conjunction with the mode signal and in synchronization with the read/write signal, data transmitted from the cooperative processor via the data terminal and directing the input buffer to hold the data that has been received; and directing the data memory pointer to generate, based on the address information held in the input buffer, a write address to be given to the internal data memory and thereby writing the data held in the input buffer into the internal data memory.

The present invention not only enables efficient data transfer between the processors but also improves the efficiency with which the multi-processor system is mounted on a printed circuit board by directly connecting the processors.

BRIEF DESCRIPTION OF THE DRAWINGS

FIG. 4 illustrates switching between the input/output directions of each of the read/write terminal XR/W and mode terminal XMD of FIG. 3;

FIG. 5 illustrates switching between the input/output directions of the data terminal XDATA of FIG. 3;

FIG. 7 shows the selecting operations of the two multiplexers of FIG. 6;

FIG. 10 shows the operation of the memory control circuit (MEMCNT) of FIG. 6;

DETAILED DESCRIPTION OF THE INVENTION

Figure 1:
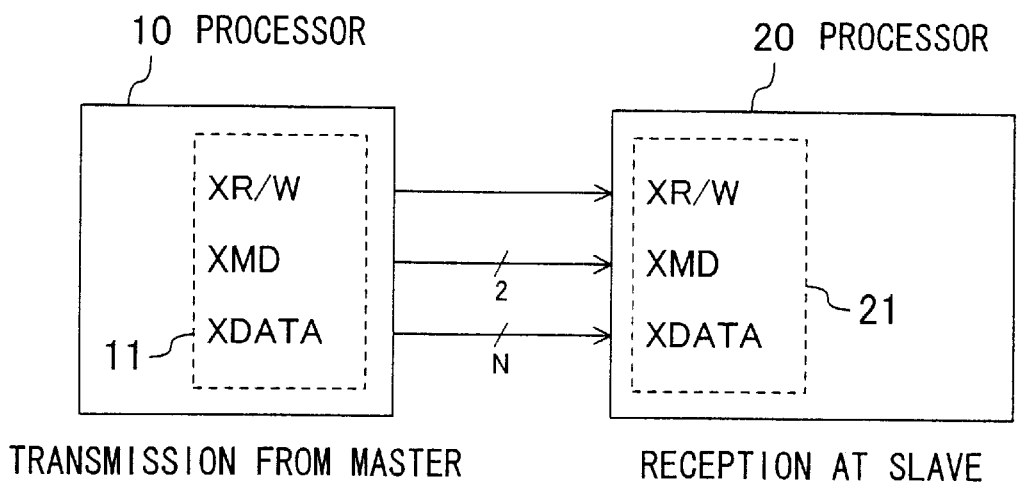
FIG. 1 is a block diagram showing an example of a structure of a multi-processor system using an interface according to the present invention.

Referring now to the drawings, an embodiment of an interface for a multiprocessor according to the present invention will be described. The description will be given primarily to the mechanism of transferring address information from one processor to the other processor and a method of using the address information.

Figure 2:
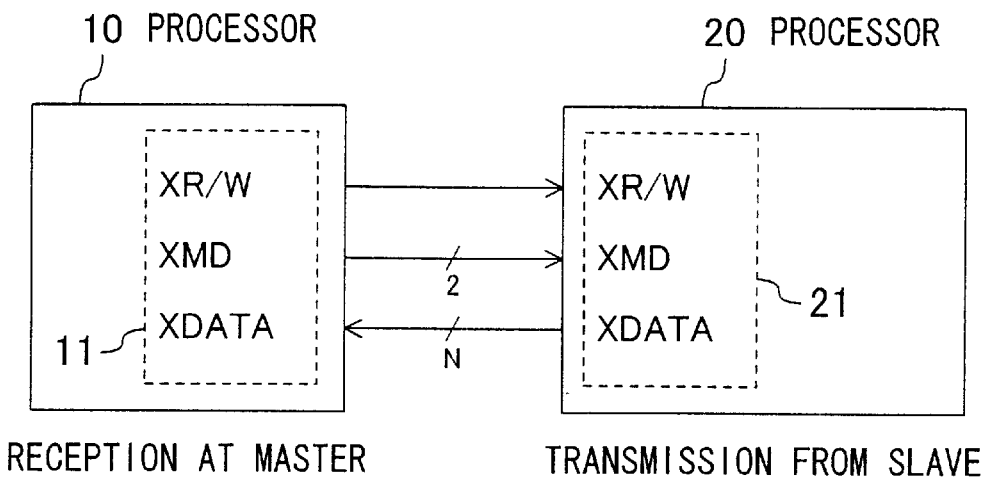
FIG. 2 is a block diagram showing another example of the structure of the multi-processor system using the interface according to the present invention.

As shown in FIGS. 1 and 2, interfaces 11 and 21 according to the present invention are incorporated as respective input/output ports in processors 10 and 20. Each of the interfaces 11 and 21 has a read/write terminal XR/W, a mode terminal XMD (2 bits), and a data terminal XDATA (N bits: N is an arbitrary integer) such that the two interfaces 11 and 21 are connected directly at the three types of terminals. Of the two interfaces 11 and 21 connected directly, either one operates as a master and the other operates as a slave. The master and slave operations performed by the interfaces 11 and 21 are determined in accordance with user programs within the processors. FIG. 1 shows an example of data transfer from the master processor 10 to the slave processor 20. FIG. 2 shows an example of data transfer from the slave processor 20 to the master processor 10.

The mode terminal XMD represents transfer modes. The transfer modes include an initial mode, a start address mode, an end address mode, and a normal mode. The initial mode indicates an initialized state. The start address mode indicates that a signal at the data terminal XDATA represents a start address for an internal data memory of the slave processor. The end address mode indicates that the signal at the data terminal XDATA represents an end address for an internal data memory of the slave processor. The normal mode indicates that the signal at the data terminal XDATA represents data to be transferred. The states of signals at the mode terminal XMD and the data terminal XDATA change in synchronization with the state of a signal at the read/write terminal XR/W.

Figure 3:
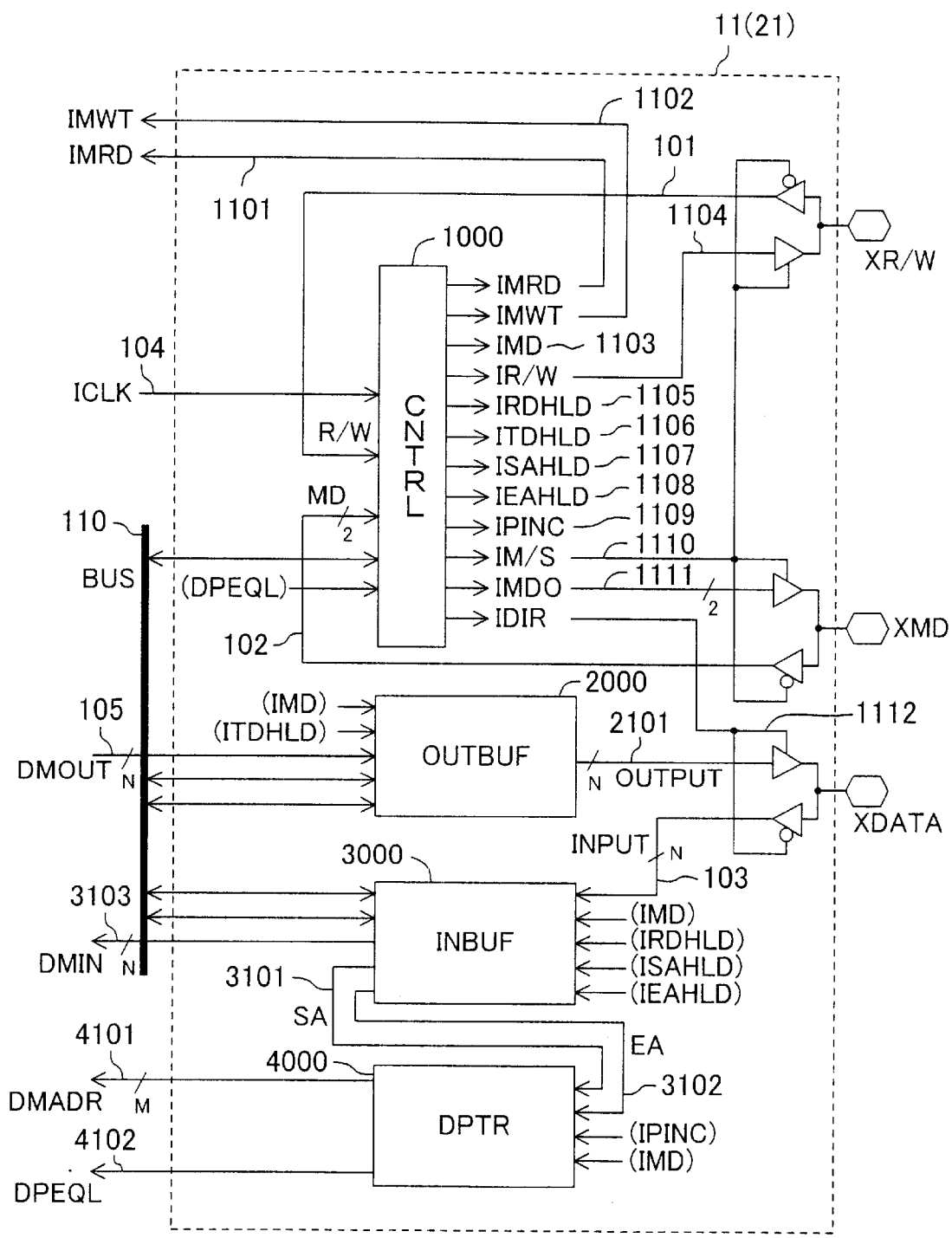
FIG. 3 is a block diagram showing an example of an internal structure of the interface of each of FIGS. 1 and 2.

FIG. 3 shows an overall structure of the interface according to the present invention. The interface 11 (21) of FIG. 3 is composed of a control circuit (CNTRL) 1000, an output buffer (OUTBUF) 2000, an input buffer (INBUF) 3000, and a data memory pointer (DPTR) 4000.

Each of the read/write terminal XR/W and the mode terminal XMD is switched to an output direction when a master operation is performed and to the input direction when a slave operation is performed. Specifically, the input/output directions of the read/write terminal XR/W and the mode terminal XMD are determined by the value of an internal master/slave indicative signal (IM/S) 1110 (see FIG. 4). The slave operation is indicated by IM/S="0", while the master operation is indicated by IM/S="1". The signals at the read/write terminal XR/W and at the mode terminal XMD are processed as a read/write signal (R/W) 101 and a mode signal (MD) 102, respectively, within the processor.

The input/output directions of the data terminal XDATA are determined in accordance with the user program within the processor irrespective of the master or slave operation described above. Specifically, the input/output directions of the data terminal XDATA are determined by the value of a transfer direction internal indicative signal (IDIR) 1112 (see FIG. 5). Data reception (input) is indicated by IDIR="0", while data transmission (output) is indicated by IDIR="1".

The control circuit (CNTRL) 1000 of FIG. 3 receives an internal operation clock signal (ICLK) 104, the read/write signal (R/W) 101 from the read/write terminal XR/W, the mode signal (MD) 102 from the mode terminal XMD, a data memory pointer equal signal (DPEQL) 4102 from the data memory pointer (DPTR) 4000 and outputs an internal data memory read signal (IMRD) 1101, an internal data memory write signal (IMWT) 1102, an internal mode signal (IMD) 1103, an internal read/write signal (IR/W) 1104, an internal received data hold signal (IRDHLD) 1105, an internal transmission data hold signal (ITDHLD) 1106, an internal start address hold signal (ISAHLD) 1107, an internal end address hold signal (IEAHLD) 1108, an internal pointer increment signal (IPINC) 1109, the internal master/slave indicative signal (IM/S) 1110, an internal mode signal to be outputted (IMDO) 1111, and the transfer direction internal indicative signal (IDIR) 1112. The control circuit (CNTRL) 1000 is connected to an internal bus (BUS) 110 for read/write operations performed in accordance with the user program within the processor.

The output buffer (OUTBUF) 2000 receives the internal mode signal (IMD) 1103, the internal transmission data hold signal (ITDHLD) 1106, and an internal data memory output data (DMOUT) 105 and outputs an output signal (OUTPUT) 2101 to the data terminal XDATA. The output buffer (OUTBUF) 2000 is connected to the internal bus (BUS) 110 for the read/write operations performed in accordance with the user program within the processor.

The input buffer (INBUF) 3000 receives an input signal (INPUT) 103 from the data terminal XDATA, the internal mode signal (IMD) 1103, the internal received data hold signal (IRDHLD) 1105, the internal start address hold signal (ISAHLD) 1107, and the internal end address hold signal (IEAHLD) 1108 and outputs a data memory input data (DMIN) 3103, an access start address (SA) 3101, and an access end address (EA) 3102. The input buffer (INBUF) 3000 is connected to the internal bus (BUS) 110 for the read/write operations performed in accordance with the user program within the processor.

The data memory pointer (DPTR) 4000 receives the internal mode signal (IMD) 1103, the internal pointer increment signal (IPINC) 1109, the access start address (SA) 3101, and the access end address (EA) 3102 and outputs a data memory address (DMADR) 4101 and the data memory pointer equal signal (DPEQL) 4102.

A description will be given first to a structure of the control circuit (CNTRL) 1000 with reference to FIG. 6. The control circuit (CNTRL) 1000 is composed of a memory control circuit (MEMCNT) 1200, a transfer mode control circuit (MDCNT) 1300, a control register (CR) 1400, a read/write signal generating circuit (R/W GEN) 1500, a first multiplexer 1600, and a second multiplexer 1700.

FIG. 7 shows the respective operations of the multiplexers 1600 and 1700. When IM/S="1", i.e., when the master operation is performed, the first multiplexer 1600 selects a provisional read/write signal (PR/W) 1501 from the read/write signal generating circuit (R/W GEN) 1500 as the internal read/write signal (IR/W) 1104, while the second multiplexer 1700 selects a provisional mode signal (PMD) 1401 from the control register (CR) 1400 as the internal mode signal to be outputted (IMDO) 1111. When IM/S="0", i.e., when the slave operation is performed, the first multiplexer 1600 selects the read/write signal (R/W) 101 from the read/write terminal XR/W, while the second multiplexer 1700 selects the mode signal (MD) 102 from the mode terminal XMD.

Figure 8:
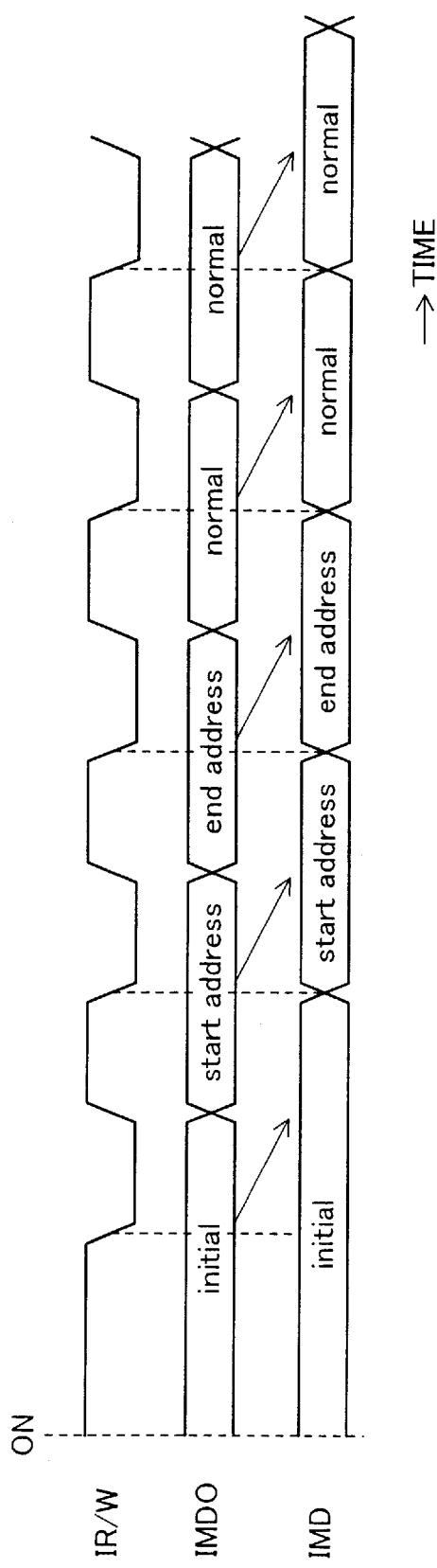
FIG. 8 is a timing chart illustrating the operation of the transfer mode control circuit (MDCNT) of FIG. 6.

The transfer mode control circuit (MDCNT) 1300 latches the internal mode signal to be outputted (IMDO) 1111 in synchronization with a falling transition in the internal read/write signal (IR/W) 1104 and thereby generates the internal mode signal (IMD) 1103 (see FIG. 8). The initial state of the internal mode signal (IMD) 1103 is the initial mode.

Figure 9:
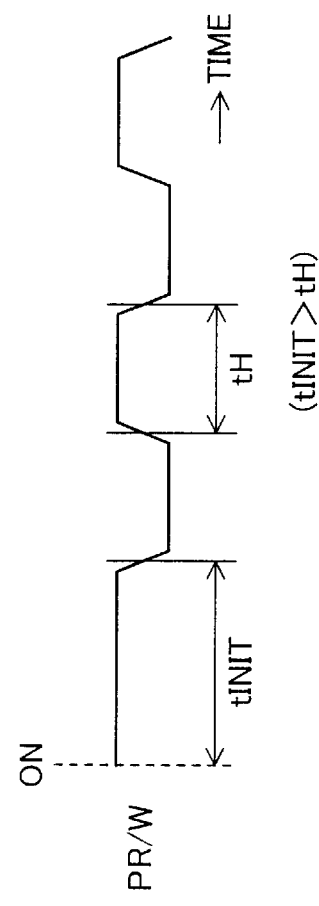
FIG. 9 is a timing chart illustrating the operation of the read/write signal generating circuit (R/W GEN) of FIG. 6.

The read/write signal generating circuit (R/W GEN) 1500 generates the provisional read/write signal (PR/W) 1501 serving as the internal read/write signal (IR/W) 1104 during the master operation by dividing the internal operation clock signal (ICLK) 104. The read/write signal generating circuit (R/W GEN) 1500 initiates oscillation after a time (tINIT) not less than half a period (tH) has elapsed from the initiation of the operation (see FIG. 9). In addition, the read/write signal generating circuit (R/W GEN) 1500 is so configured as to change the provisional read/write signal (PR/W) 1501 only if a flag signal (FLG) 1402 from the control register (CR) 1400 represents "0".

Figure 11:
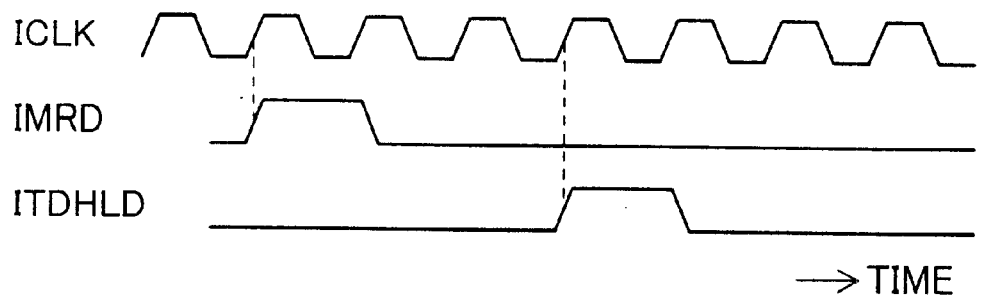
FIG. 11 is a timing chart illustrating the operation of the memory control circuit (MEMCNT) of FIG. 6.
Figure 12:
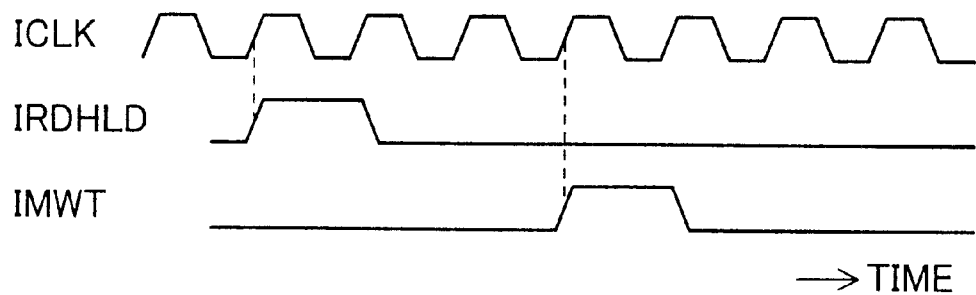
FIG. 12 is another timing chart illustrating the operation of the memory control circuit (MEMCNT) of FIG. 6.

The memory control circuit (MEMCNT) 1200 receives the internal read/write signal (IR/W) 1104, the internal mode signal (IMD) 1103, and the transfer direction internal indicative signal (IDIR) 1112 and outputs the internal data memory read signal (IMRD) 1101, the internal data memory write signal (IMWT) 1102, the internal received data hold signal (IRDHLD) 1105, the internal transmission data hold signal (ITDHLD) 1106, the internal start address hold signal (ISAHLD) 1107, the internal end address hold signal (IEAHLD) 1108, and the internal pointer increment signal (IPINC) 1109. FIG. 10 shows conditions for the pulse generation of the internal pointer increment signal (IPINC) 1109, the internal data memory read signal (IMRD) 1101, the internal received data hold signal (IRDHLD) 1105, the internal start address hold signal (ISAHLD) 1107, and the internal end address hold signal (IEAHLD) 1108 in the memory control circuit (MEMCNT) 1200. The internal transmission data hold signal (ITDHLD) 1106 and the internal data memory write signal (IMWT) 1102 are generated in synchronization with the internal operation clock signal (ICLK) 104 after several cycles after the pulse generation of the internal data memory read signal (IMRD) 1101 and the internal received data hold signal (IRDHLD) 1105, respectively. The present embodiment assumes that these signals are generated 3 cycles after the pulse generation. The number of cycles is related to an access time to the internal data memory. FIGS. 11 and 12 show the relations among these signals. It is to be noted that the pulse of the internal pointer increment signal (IPINC) 1109 is also generated even when an ON signal, which will be described later, changes from "0" to "1" in the initial mode.

The control register (CR) 1400 permits read/write operations performed with respect thereto via the internal bus (BUS) 110 in accordance with the user program within the processor and outputs the transfer direction internal indicative signal (IDIR) 1112 for determining the input/output directions of the interface and the internal master/slave indicative signal (IM/S) 1110 for determining the master/slave operations of the interface via the internal bus (BUS) 110. The control register (CR) 1400 also generates the provisional mode signal (PMD) 1401 serving as the internal mode signal to be outputted (IMDO) 1111 during the master operation based on an instruction from the internal bus (BUS) 110.

Figure 6:
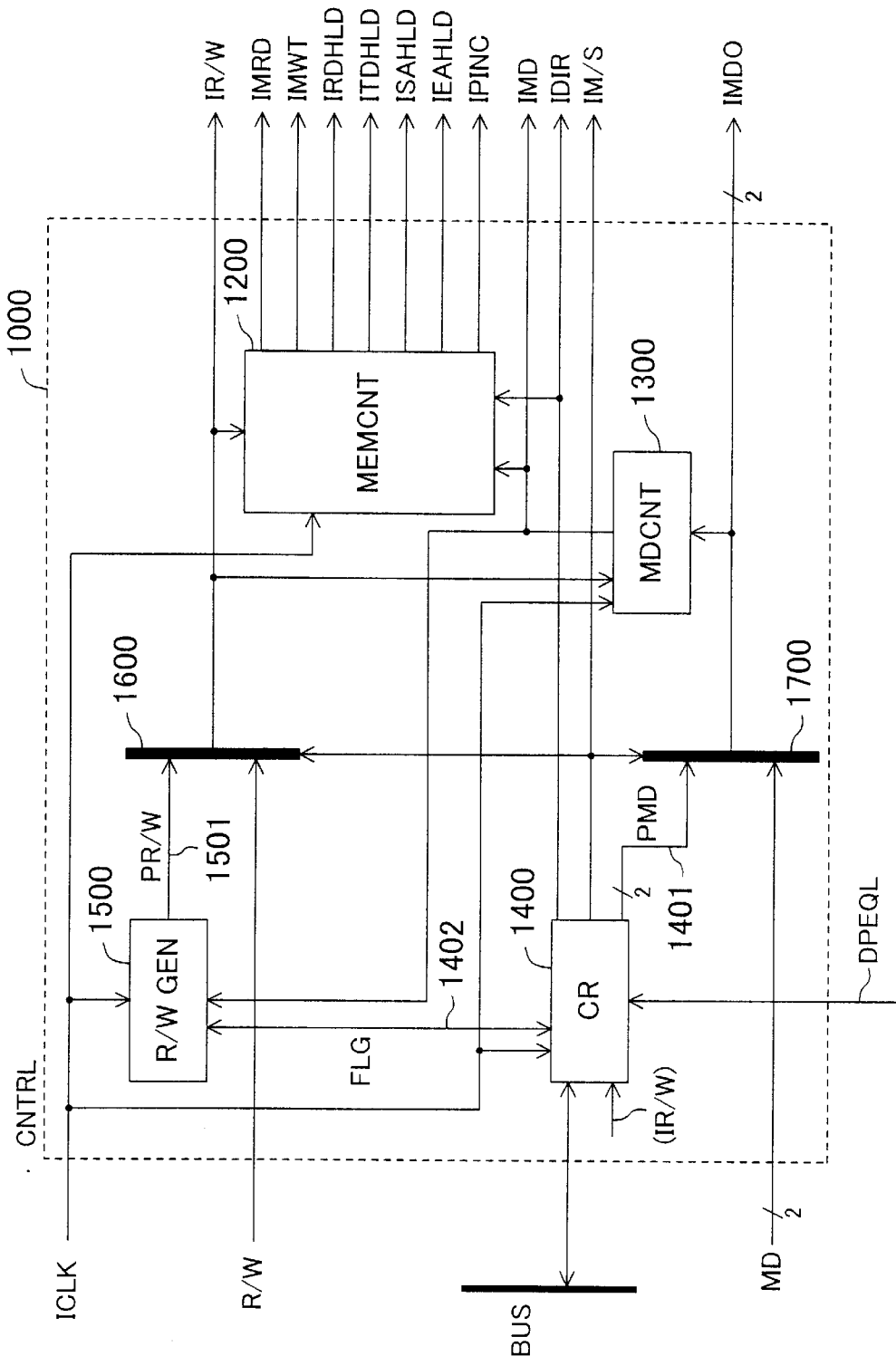
FIG. 6 is a block diagram showing a detailed structure of the control circuit (CNTRL) of FIG. 3.
Figure 13:
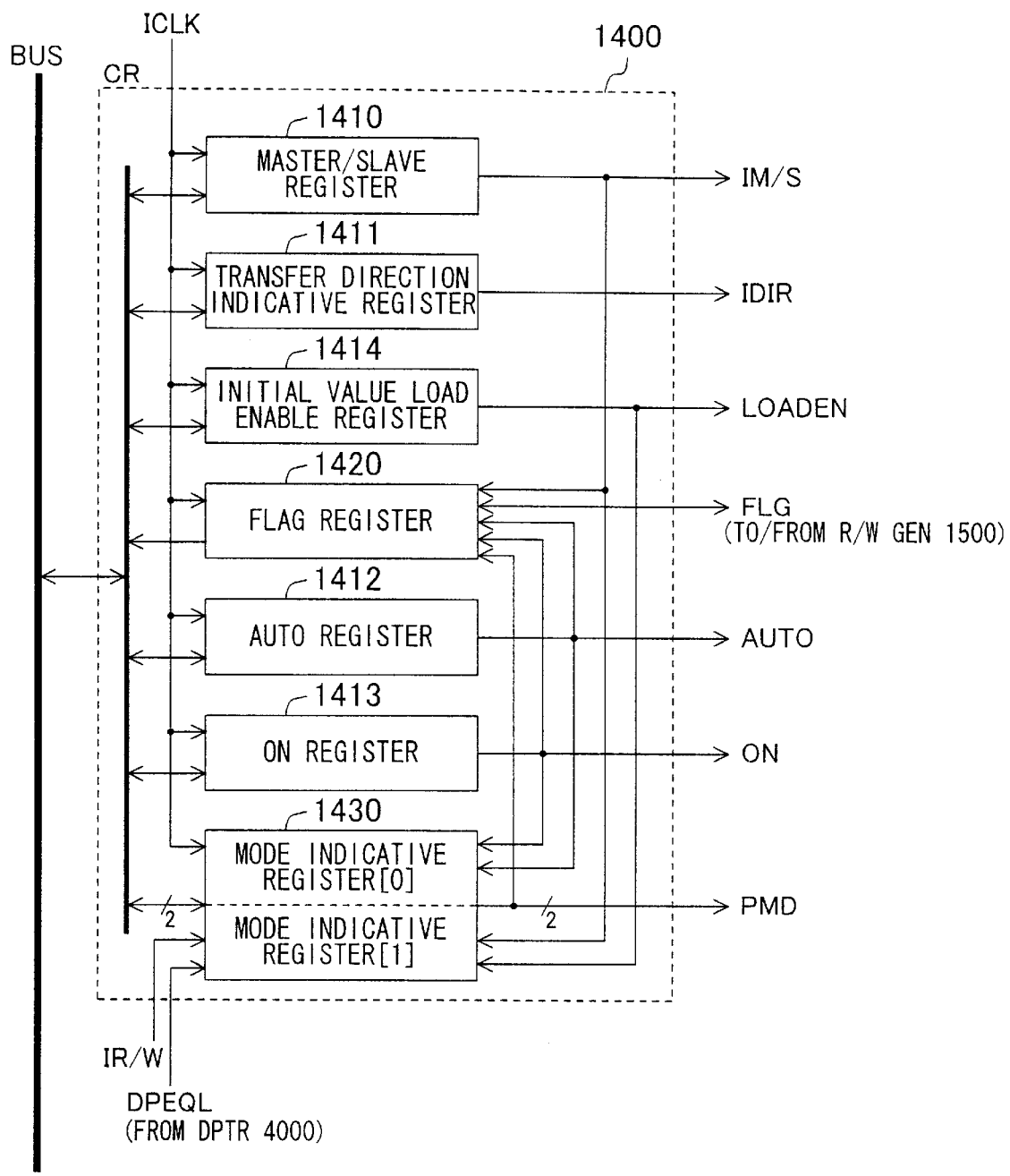
FIG. 13 is a block diagram showing a detailed structure of the control register (CR) of FIG. 6.

FIG. 13 shows a detailed structure of the control register (CR) 1400 of FIG. 6. The control register (CR) 1400 of FIG. 13 is composed of a master/slave register 1410, a transfer direction indicative register 1411, an AUTO register 1412, an ON register 1413, an initial value load enable register 1414, a flag register 1420, and a mode indicative register 1430. The flag register 1420 is so configured as to output data to the internal bus (BUS) 110 but not to receive data from the internal bus (BUS) 110. As for the other registers, they can all transmit and receive data to and from the internal bus (BUS) 110.

The master/slave register 1410 outputs data held therein as the internal master/slave indicative signal (IM/S) 1110. The transfer direction indicative register 1411 outputs data held therein as the transfer direction internal indicative signal (IDIR) 1112. The AUTO register 1412 outputs data held therein as an AUTO signal to indicate an automatic mode when AUTO="1" and an interactive mode when AUTO="0". The ON register 1413 outputs data held therein as the ON signal to indicate an activation or operation when ON="1" and a halt when ON="0". The initial value load enable register 1414 outputs data held therein as a load enable (LOADEN) signal to indicate the operation of returning a current data memory pointer (DP), which will be described later, to an initial value when LOADEN="1" and when the data memory pointer equal signal (DPEQL) 4102 is "1". When LOADEN="0", the initial value load enable register 1414 does not indicate the operation.

The data held in the flag register 1420 is the flag signal (FLG) 1402 for controlling the oscillating operation of the read/write signal generating circuit (R/W GEN) 1500. The transitions of the flag signal (FLG) 1402 are as follows:

(1) The initial value of FLG is "0".
(2) When IM/S="1", AUTO="0", ON="1" (the master operation, the interactive mode, and the ON state), and FLG="0", the internal read/write signal (IR/W) 1104 changes sequentially to "1", "0", and "1" and then the read/write signal generating circuit (R/W GEN) 1500 causes a transition to FLG="1".
(3) When IM/S="1", AUTO="0", ON="1" (the master operation, the interactive mode, and the ON state), and FLG="1" are satisfied, the data held in the mode indicative register 1430 changes (except for changing to the normal mode) and then FLG="0" is restored.
(4) In the other cases, FLG="0" is constantly held.

The mode indicative register 1430 outputs 2-bit data stored therein as the provisional mode signal (PMD) 1401. The 2-bit data stored in the mode indicative register 1430 represents the initial mode when it is (0, 0), the start address mode when it is (0, 1), the end address mode when it is (1, 0), and the normal mode when it is (1, 1). The operation of the mode indicative register 1430 is as follows:

(1) The initial value of the mode indicative register 1430 is (0, 0) representing the initial mode.

(2) When IM/S="1", AUTO="1", and ON="1" (the master operation, the automatic mode, and the ON state), the mode indicative register 1430 changes sequentially from (0, 0) to (0, 1), (1, 0), and (1,1) in synchronization with the rising edge of the internal read/write signal (IR/W) 1104 and then holds (1, 1) representing the normal mode.

(3) When ON="1" and LOADEN="1" (the ON state and the initial value load enable state), the mode indicative register 1430 changes to (0, 0) representing the initial mode under the condition that the data memory pointer equal signal (DPEQL) 4102 is "1".

(4) Under the conditions other than those stated above (including the interactive mode), the mode indicative register 1430 holds a value written therein in accordance with the user program within the processor.

Figure 14:
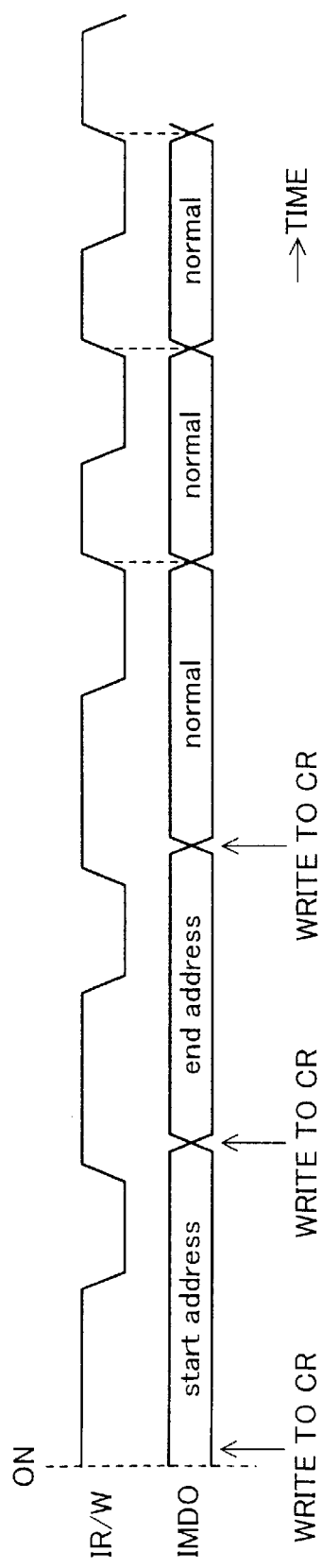
FIG. 14 is a timing chart illustrating the operation of the control circuit (CNTRL) of FIG. 6 when the control register (CR) of FIG. 13 is set to perform a master operation in an interactive mode.

A description will be given herein below to the control of the interactive mode during the master operation. In the interactive mode, each of transfer modes is set individually in the control register (CR) 1400 in accordance with the user program within the processor (see FIG. 14). In this case, after the transfer mode is set in the control register (CR) 1400, the transitions of IR/W from "1", to "0", then to "1" occur only once. The occurrence of the transitions are recognizable by referring to the flag register 1420 in accordance with the user program within the processor. Although the interactive operation is performed when the start address and the end address are set, automatic and periodic transitions occur in the internal read/write signal (IR/W) 1104 once data transfer is initiated and thereafter.

A description will be given next to the control of the automatic mode during the master operation. The internal mode signal to be outputted (IMDO) 1111 changes automatically and periodically from the time at which the present interface is turned on in the settings of the master operation and the automatic mode and thereafter. Accordingly, the state of the signal at the mode terminal XMD similarly changes to the internal mode signal to be outputted (IMDO) 1111. The control register (CR) 1400 sequentially changes the provisional mode signal (PMD) 1401, which is selected by a second multiplexer 1700 so that the internal mode signal to be outputted (IMDO) 1111 is resultantly equal to the provisional mode signal (PMD) 1401. At this time, the provisional read/write signal (PR/W) 1501 is outputted periodically from the read/write signal generating circuit (R/W GEN) 1500 to coincide with the internal read/write signal (IR/W) 1104.

Figures 16, 17:
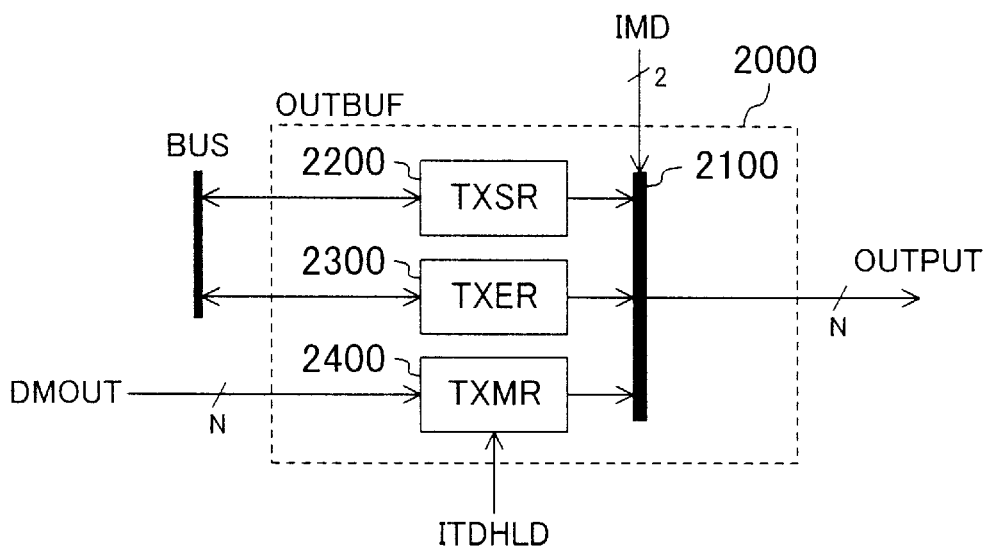
FIG. 16 is a block diagram showing a detailed structure of the-output buffer (OUTBUF) of FIG. 3.
FIG. 17 shows the selecting operation of the multiplexer of FIG. 16.

A description will be given next to a structure of the output buffer (OUTBUF) 2000 with reference to FIG. 16. The output buffer (OUTBUF) 2000 is composed of: a multiplexer 2100; a start address output register (TXSR) 2200 for determining a start address on the slave side; an end address output register (TXER) 2300 for determining an end address on the slave side; and a data output register (TXMR) 2400 for holding data read from the internal data memory. The start address output register (TXSR) 2200 and the end address output register (TXER) 2300 are connected to the internal bus (BUS) 110 and permits read/write operations performed with respect thereto in accordance with the user program within the processor. The data output register (TXMR) 2400 holds an output from the internal data memory with a timing indicated by the internal transmission data hold signal (ITDHLD) 1106. An output from the output buffer (OUTBUF) 2000 is controlled as shown in FIG. 17.

Figures 18, 19:
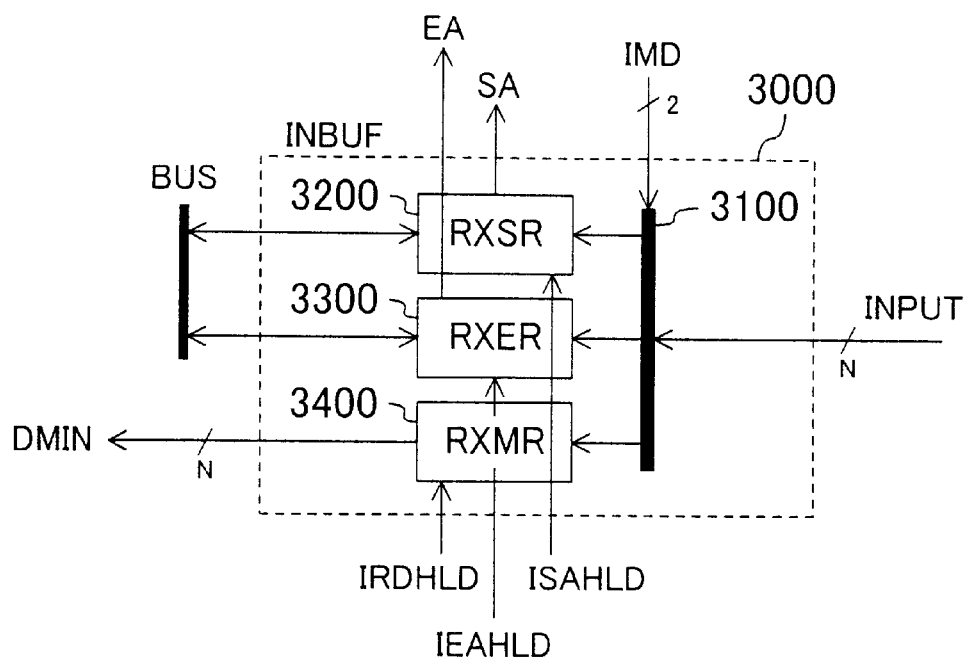
FIG. 18 is a block diagram showing a detailed structure of the input buffer (INBUF) of FIG. 3.
FIG. 19 shows the selecting operation of the multiplexer of FIG. 18.

A description will be given to a structure of the input buffer (INBUF) 3000 with reference to FIG. 18. The input signal (INPUT) 103 from the data terminal XDATA is stored in any of the start address input register (RXSR) 3200, the end address input register (RXER) 3300, and the data input register (RXMR) 3400 in accordance with the internal mode signal (IMD) 1103 (see FIG. 19). A reference numeral 3100 denotes a multiplexer. In the case of receiving data from the outside, the signals from the data terminal XDATA are stored and held with respective timings indicated by the internal start address hold signal (ISAHLD) 1107, the internal end address hold signal (IEAHLD) 1108, and the internal received data hold signal (IRDHLD) 1105 (see FIG. 10). In the case where addresses are not set from the outside, it is also possible to set each of the addresses via the internal bus (BUS) 110 in accordance with the user program within the processor.

Figures 20, 21:
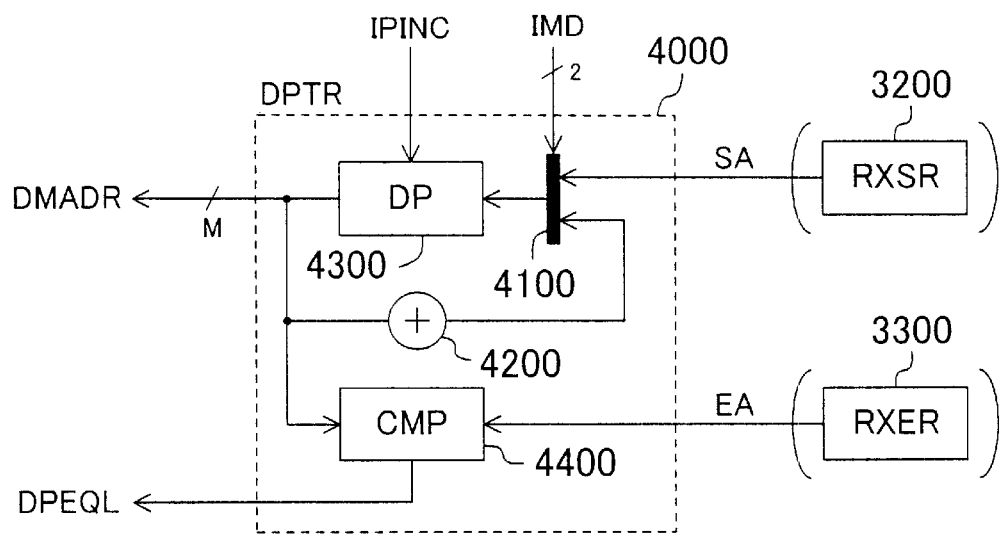
FIG. 20 is a block diagram showing a detailed structure of the data memory pointer (DPTR) of FIG. 3.
FIG. 21 shows the selecting operation of the multiplexer of FIG. 20.

The data memory pointer (DPTR) 4000 will be described with reference to FIG. 20. The data memory pointer (DPTR) 4000 is composed of: a multiplexer 4100; an incrementer 4200; a current data memory pointer (DP) 4300; and a comparator (CMP) 4400 to store and hold an output from the multiplexer 4100 with the timing with which the internal pointer increment signal (IPINC) 1109 is generated. The conditions for the generation of the internal point increment signal (IPINC) are as shown in FIG. 10. FIG. 21 shows the operation of the multiplexer 4100. A comparator (CMP) 4400 compares the value of the current data memory pointer (DP) 4300 with the end address stored in the end address input register (RXER) 3300 and activates the data memory pointer equal signal (DPEQL) 4102 when there is a coincidence. The incrementer 4200 constantly increments an output from the current data memory pointer (DP) 4300 by 1 and outputs the incremented output.

The transition of the data memory pointer equal signal (DPEQL) 4102 to "1" causes a transition of the transfer mode to the initial mode. At this time, the access start address (SA) 3101 is selected in the multiplexer 4100, as shown in FIG. 21. Consequently, the internal pointer increment signal (IPINC) 1109 is generated on the subsequent rising edge of the internal read/write signal (IR/W) 1104 (see FIG. 10) so that the value of the start address input register (RXSR) 3200 is read into the current data memory pointer (DP) 4300. It is also possible to cause an interruption with the data memory pointer equal signal (DPEQL) 4102 when the current data memory pointer (DP) 4300 coincides with the end address input register (RXER) 3300. This can be used if the transfer is to be completed.

The followings are two specific examples using the foregoing structure, which are:

(Example 1) Transmission from Master, Reception at Slave without Address Information; and (Example 2) Transmission from Master, Reception at Slave with Address Inforamtion (see FIG. 1). It is assumed that a data processing method in the subsequent-stage processor 20 has been predetermined for each region of the internal data memory in the subsequent-stage processor 20. It is also assumed that the previous-stage processor 10 has also been notified of the memory map. Since it is assumed that the previous-stage processor 10 and the subsequent-stage processor 20 use the interfaces 11 and 22 with the same structure in the following examples, the same reference numerals are used. However, "previous-stage" and "subsequent-stage" are added mandatorily to the processors, thereby making a distinction and avoiding any confusion.

EXAMPLE 1

Data is sent from the previous-stage processor (master processor) 10 to the subsequent-stage processor (slave processor) 20. Although a processing method implemented in the subsequent-stage processor 20 depends on the transferred data, it is assumed that the subsequent-stage processor 20 has already been notified of processing to be performed by any means. This allows the subsequent-stage processor 20 to determine a region in which the transferred data is to be stored in accordance with the user program within the subsequent-stage processor 20 itself.

The subsequent-stage processor 20 sets the start address and the end address in the start address input register (RXSR) 3200 and in the end address input register (RXER) 3300, respectively, via the internal bus (BUS) 110. Since the previous-stage processor 10 need not transmit address information, the normal mode is set appropriately in the previous-stage processor 10 from the beginning. The previous-stage processor 10 sets the interactive mode and the normal mode in the control register (CR) 1400 via the internal bus (BUS) 110. The previous-stage processor 10 further sets respective addresses in the start address input register (RXSR) 3200 and in the end address input register (RXER) 3300 via the internal bus (BUS) 110 through the execution of the user program. Thereafter, the ports are turned on by setting "1" in the ON register 1413 of each of the processors 10 and 20.

A description will be given herein below with reference to the timing charts of FIG. 22 (subsequent-stage processor 20) and FIG. 23 (previous-stage processor 10).

Figure 22:
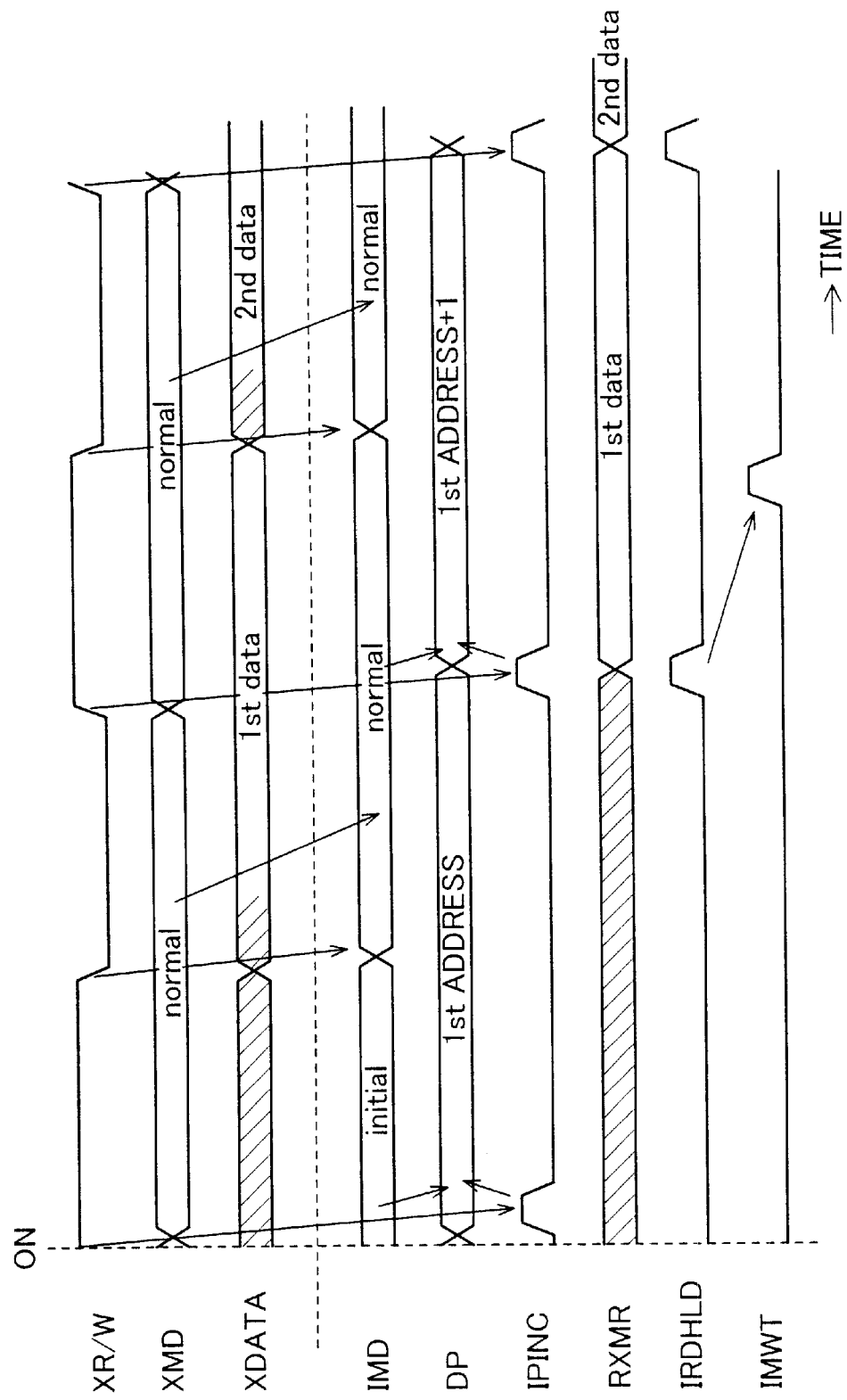
FIG. 22 is a timing chart illustrating the operation of the interface of FIG. 3 in the subsequent-stage slave processor when address information is not transferred.

As shown in FIG. 22, upon the turning on of the port of the subsequent-stage processor 20, the internal mode signal (IMD) 1103 changes to the initial mode, whereby a value (1stADDRESS) preset in the start address input register (RXSR) 3200 is loaded into the current data memory pointer (DP) 4300. The internal mode signal (IMD) 1103 becomes normal on the first falling edge of the internal read/write signal (IR/W) 1104. Then, the internal received data hold signal (IRDHLD) 1105 is activated in response to the first rising edge of the internal read/write signal (IR/W) 1104. As a result, data (1st data) from the data terminal XDATA is held in the data input register (RXMR) 3400. On the other hand, the current data memory pointer (DP) 4300 is updated to 1stADDRESS+1. However, the value of the current data memory pointer (DP) 4300 before it is updated is held outside the interface till it is written actually in the internal data memory (not shown). Subsequently, the internal data memory write signal (IMWT) 1102 is activated with delay in synchronization with the internal operation clock signal (ICLK) 104 so that data in the data input register (RXMR) 3400 is written at the address (1stADDRESS) in the current data memory pointer (DP) 4300 before it is updated in the internal data memory. By repeating the foregoing procedure, data is stored successively thereafter at consecutive addresses in the internal data memory.

Figure 23:
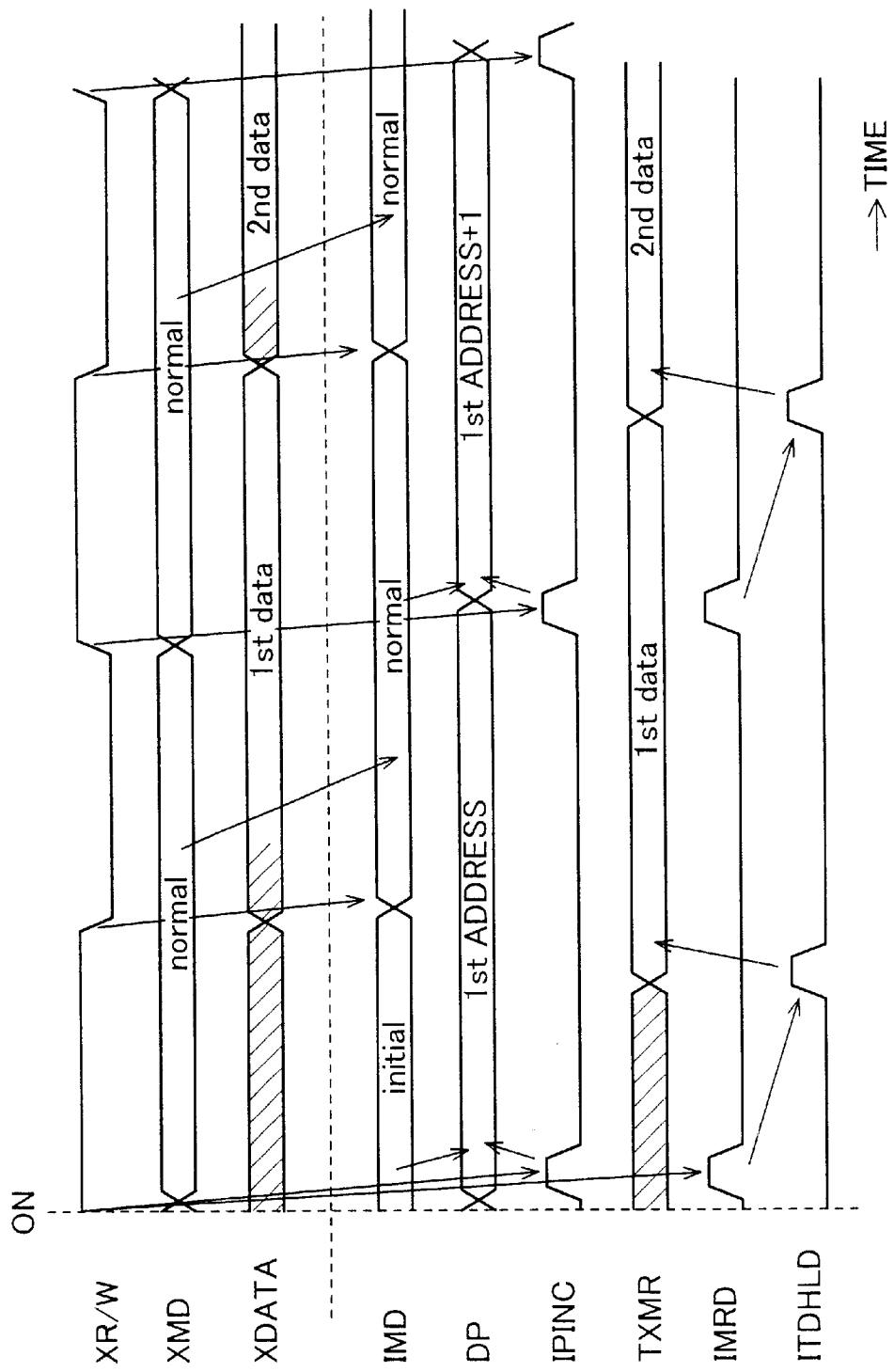
FIG. 23 is a timing chart illustrating the operation of the interface of FIG. 3 in the previous-stage master processor when address information is not transferred.

As shown in FIG. 23, upon the turning on of the port of the previous-stage processor 10, the internal mode signal (IMD) 1103 changes to the initial mode, whereby a value (1stADDRESS) preset in the start address input register (RXSR) 3200 is loaded into the current data memory pointer (DP) 4300. The 1stADDRESS is generally different from the 1stADDRESS in the subsequent-stage processor 20. At the same time, the internal data memory read signal (IMRD) 1101 is activated to induce the internal data memory to read. Then, the internal transmission data hold signal (ITDHLD) 1106 is outputted with delay in synchronization with the internal operation clock signal (ICLK) 104. As a result, the data (1st data) from the internal data memory is held in the data output register (TXMR) 2400 and outputted therefrom to the data terminal XDATA in synchronization with the falling edge of the first internal read/write signal (IR/W) 1104. On the other hand, the internal mode signal (IMD) 1103 changes to the normal mode. Thereafter, the same operation is repeated upon each rising edge of the internal read/write signal (IR/W) 1104. By thus executing a simple user program in each of the two processors 10 and 20, data can be transferred continuously.

EXAMPLE 2

Data is sent from the previous-stage processor (master processor) 10 to the subsequent-stage processor (slave processor) 20 (see FIG. 1). The processing method implemented in the subsequent-stage processor 20 depends on the transferred data and the subsequent-stage processor 20 has not been notified in advance of the type of processing to be performed. Therefore, the previous-stage processor 10 sends address information to the subsequent-stage processor 20 during data transfer and thereby notifies the subsequent-stage processor 20 of a region in which the data is to be stored. Accordingly, the subsequent-stage processor 20 judges whether the signal at the data terminal XDATA represents the address information or the transferred data from the state at the mode terminal XMD. Consequently, the subsequent-stage processor 20 does not set addresses in the start address input register (RXSR) 3200 and in the end address input register (RXER) 3300.

Since the previous-stage processor 10 should send address information, the previous-stage processor 10 stores start and end addresses in the start address output register (TXSR) 2200 and in the end address output register (TXER) 2300, respectively, via the internal bus (BUS) 110 in consideration of the processing method in the subsequent-stage processor 20. The previous-stage processor 10 further sets automatic mode in the control register (CR) 1400 and sets respective addresses in the start address input register (RXSR) 3200 and in the end address input register (RXER) 3300 via the internal bus (BUS) 110. Thereafter, the port is turned on in each of the processors 10 and 20.

Figure 15:
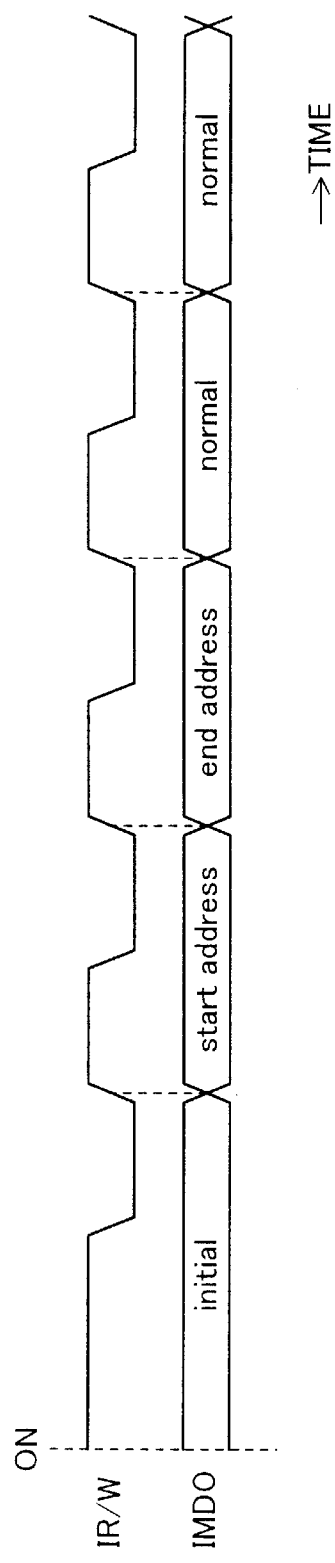
FIG. 15 is a timing chart illustrating the operation of the control circuit (CNTRL) of FIG. 6 when the control register (CR) of FIG. 13 is set to perform a master operation in an automatic mode.
Figure 24:
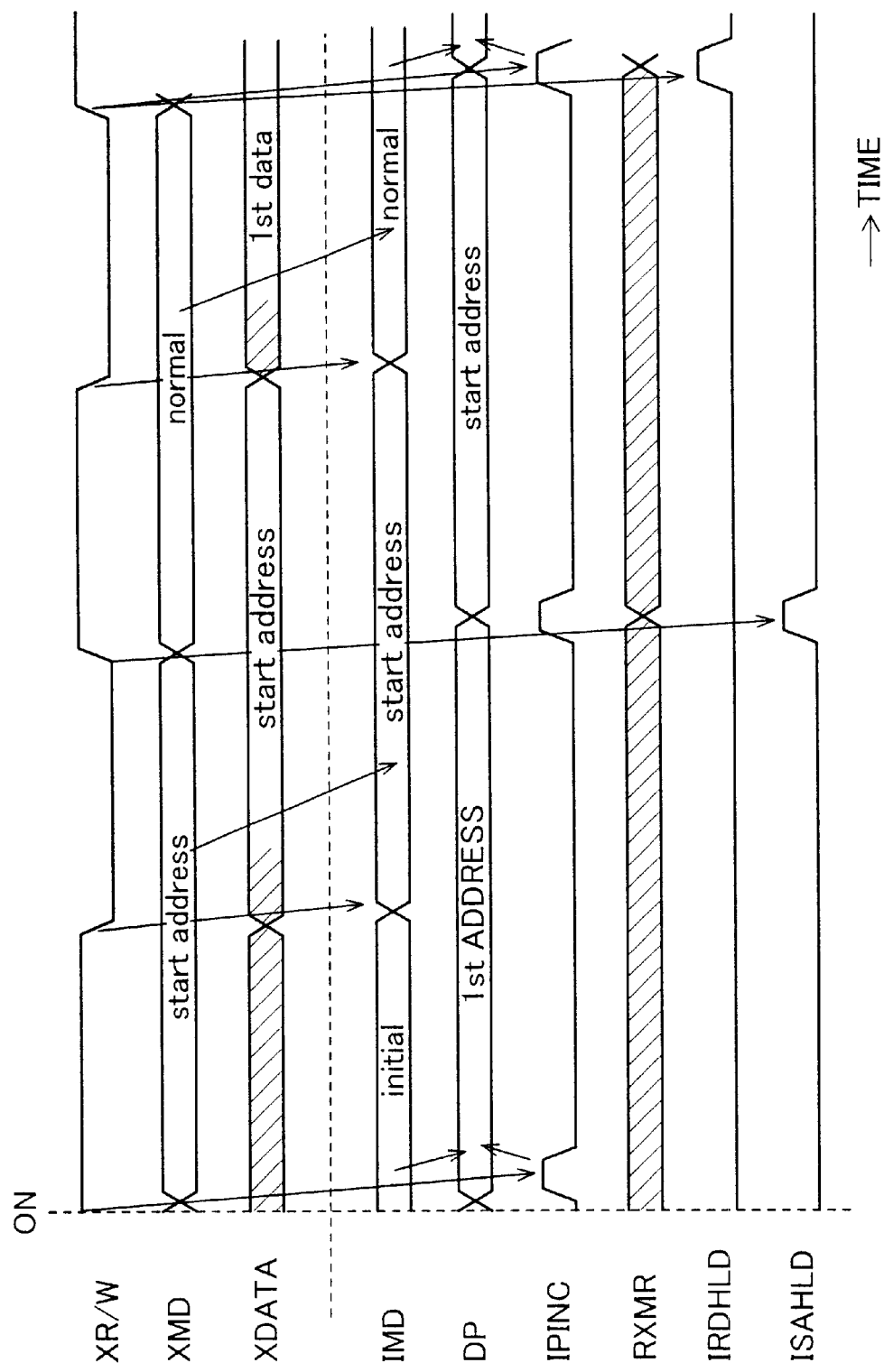
FIG. 24 is a timing chart illustrating the operation of the interface of FIG. 3 in the subsequent-stage slave processor when address information is transferred.
Figure 25:
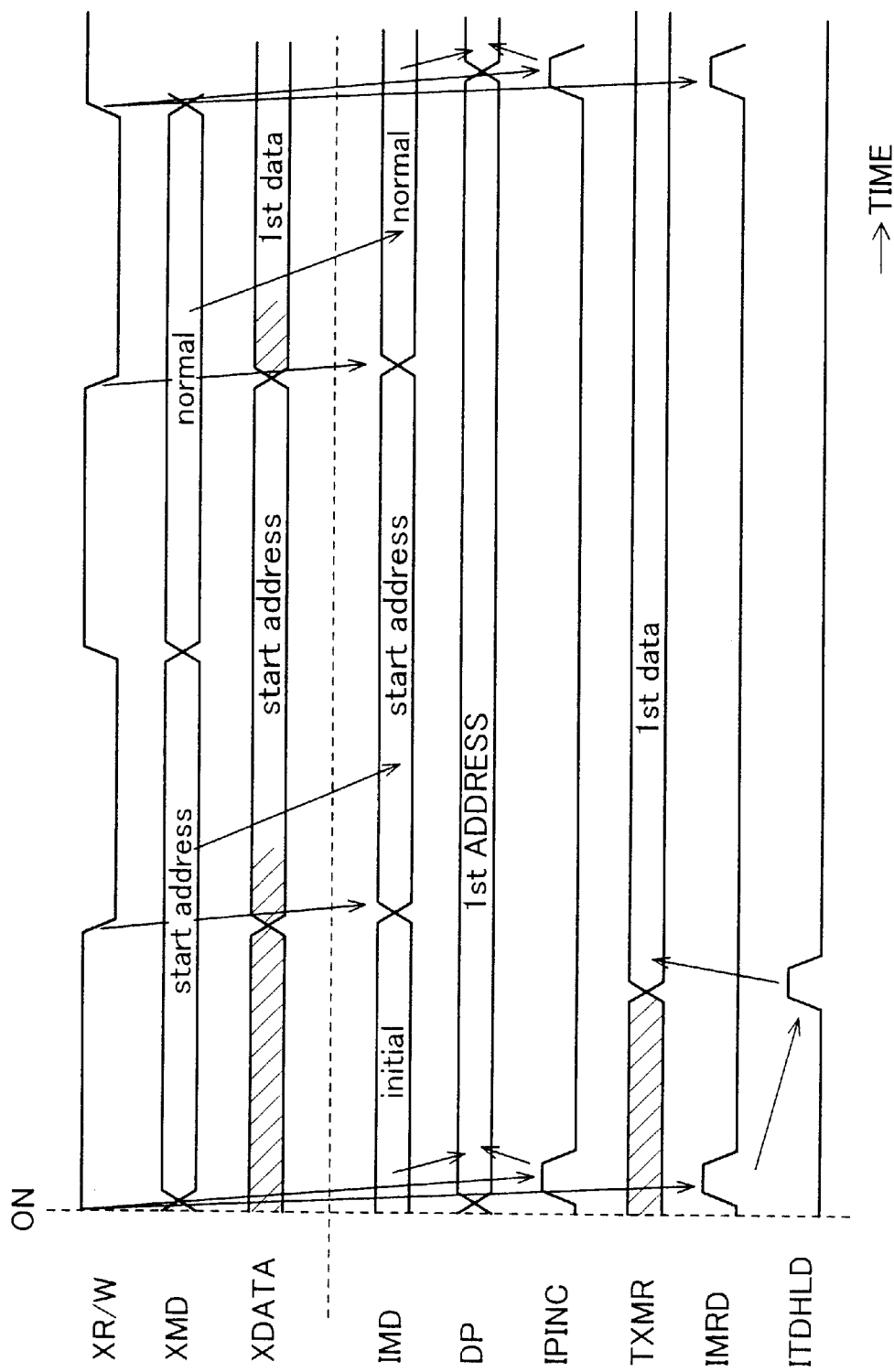
FIG. 25 is a timing chart illustrating the operation of the interface of FIG. 3 in the previous-stage master processor when address information is transferred.

A description will be given with reference to the timing charts of FIG. 24 (subsequent-stage processor 20) and FIG. 25 (previous-stage processor 10). After the turning on of the respective ports of the processors 10 and 20, the internal read/write signal (IR/W) 1104 and the internal mode signal to be outputted (IMDO) 1111 automatically change as shown in FIG. 15 and the state at the mode terminal XMD changes responsively. In FIGS. 24 and 25, however, only the start address mode and the normal mode at the mode terminal XMD are depicted.

As shown in FIG. 24, upon the turning on of the port of the subsequent-stage processor 20, the internal mode signal (IMD) 1103 changes to the initial mode, whereby the value (1stADDRESS: which is actually an indefinite value) of the start address input register (RXSR) 3200 is loaded into the current data memory pointer (DP) 4300. The subsequent-stage processor 20 receives the signal from the mode terminal XMD therefrom on the first falling edge of the internal read/write signal (IR/W) 1104 and the internal mode signal (IMD) 1103 changes to the start address mode. Then, the signal (start address) at the data terminal XDATA is loaded into the current data memory pointer (DP) 4300 in response to the first rising edge of the internal read/write signal (IR/W) 1104, whereby a true start address is set in the subsequent-stage processor 20. Subsequently, the end address is set similarly (not shown). Since the state at the mode terminal XMD changes to the normal mode, the subsequent-stage processor 20 judges that the subsequent signals at the data terminal XDATA do not indicate address information and sequentially stores the received data in the internal data memory with the updating of the current data memory pointer (DP) 4300. The subsequent operation is entirely the same as in Example 1. In FIG. 24, however, normal data transfer is depicted to occur immediately after the setting of the start address.

As shown in FIG. 25, upon the turning on of the port of the previous-stage processor 10, the internal mode signal (IMD) 1103 changes to the initial mode, whereby a value (1stADDRESS) preset in the start address input register (RXSR) 3200 is loaded into the current data memory pointer (DP) 4300. At the same time, the internal data memory read signal (IMRD) 1101 is activated to induce the internal data memory to read. Then, the internal transmission data hold signal (ITDHLD) 1106 is outputted with delay in synchronization with the internal operation clock signal (ICLK) 104. As a result, the data (1st data) from the internal data memory is held in the data output register (TXMR) 2400. The internal mode signal (IMD) 1103 changes to the start address mode in synchronization with the first falling edge of the internal read/write signal (IR/W) 1104 and the value (start address) of the start address output register (TXSR) 2200 is outputted to the data terminal XDATA. Thereafter, the internal mode signal (IMD) 1103 changes automatically and sequentially from the start address mode to the end address mode and to the normal mode in synchronization with the falling edges of the internal read/write signal (IR/W) 1104. In FIG. 25, however, the end address mode is not depicted. After the internal mode signal (IMD) 1103 changes to the normal mode, the operation is the same as in Example 1.

By thus executing a simple user program in each of the two processors 10 and 20, a location at which the transferred data is to be stored can be specified and the subsequent-stage processor 20 can be notified of the data processing method; The same shall apply to:

(Example 3) Transmission from Slave, Reception at Master without Address Information; and (Example 4) Transmission from Slave, Reception at Master with Address Information shown in FIG. 2. Either of the interactive mode and the automatic mode can be selected arbitrarily even in the case of transferring address information.

What is claimed is:

1. An interface provided for each of a plurality of processors each having an internal data memory and connected to each other to constitute a multi-processor, the interface comprising:

a data terminal for transmitting and receiving address information and data to be transferred;

a mode terminal for transmitting and receiving a mode signal indicative of whether a signal at said data terminal represents the address information or the data to be transmitted;

a read/write terminal for transmitting and receiving a read/write signal indicative of a timing for each of the signal at said data terminal and a signal at said mode terminal;

an input buffer and an output buffer each connected to said data terminal;

a data memory pointer connected to said internal data memory; and a control circuit connected to said mode terminal and to said read/write terminal, wherein for data transmission, said control circuit performs a control operation of:

directing said data memory pointer to generate a read address to be given to said internal data memory based on address information for the internal data memory of an objective processor out of the plurality of processors, the address information being held in said input buffer, thereby reading data from said internal data memory, and directing said output buffer to hold the data that has been read;

transmitting, in conjunction with said mode signal and in synchronization with said read/write signal, address information for the internal data memory of a cooperative processor out of the plurality of processors which information is held in said output buffer to said cooperative processor via said data terminal; and transmitting, in conjunction with said mode signal and in synchronization with said read/write signal, the data held in said output buffer to said cooperative processor via said data terminal and for data reception, said control circuit performs a control operation of:

receiving, in conjunction with said mode signal and in synchronization with said read/write signal, address information transmitted from said cooperative processor via said data terminal and directing said input buffer to hold the address information that has been received;

receiving, in conjunction with said mode signal and in synchronization with said read/write signal, data transmitted from said cooperative processor via said data terminal and directing said input buffer to hold the data that has been received; and directing said data memory pointer to generate, based on the address information held in said input buffer, a write address to be given to said internal data memory and thereby writing the data held in said input buffer into said internal data memory.

2. The interface according to claim 1, wherein said input buffer comprises:

a start address input register for holding a start address composing a part of said address information;

an end address input register for holding an end address composing another part of said address information; and a data input register for holding said data that has been received.

3. The interface according to claim 2, wherein said mode signal is indicative of whether the signal at said data terminal represents the start address, the end address, or the data to be transferred.

4. The interface according to claim 1, wherein said control circuit is configured so as to execute, regardless of whether said data transmission or said data reception is performed, each of a master operation of transmitting said mode signal and said read/write signal to the cooperative processor and a slave operation of receiving said mode signal and said read/write signal from the cooperative processor.

5. The interface according to claim 4, wherein said control circuit has an interactive mode during said master operation such that said mode signal is updated and a pulse of said read/write signal is generated in accordance with an internal program.

6. The interface according to claim 5, wherein said control circuit has a function of automatically and sequentially generating pulses of said read/write signal when said mode signal is updated in said interactive mode to indicate that the signal at said data terminal is the data to be transferred.

7. The interface according to claim 4, wherein said control circuit has an automatic mode during said master operation such that said mode signal is updated automatically and pulses of said read/write signals are generated automatically and sequentially without depending on an internal program.

8. The interface according to claim 2, wherein said data memory pointer has a current data memory pointer in which, after the start address held in said start address input register is loaded as an initial value into said current data memory pointer, the held address is updated successively in synchronization with said read/write signal such that said read address or said write address is generated.

9. The interface according to claim 8, wherein said data memory pointer further has a comparator for comparing the address held in said current data memory pointer with the end address held in said end address input register and generating an interruption request if the two addresses coincide with each other.

10. The interface according to claim 8, wherein said data memory pointer further has a comparator for comparing the address held in said current data memory pointer with the end address held in said end address input register and performing a control operation such that, if the two addresses coincide with each other, the start address held in said start address input register is loaded again as the initial value into said current data memory pointer.

11. A method for interfacing a plurality of processors each having an internal data memory and connected to each other to constitute a multi-processor, each of the processors having an input/output port provided with:

a data terminal for transmitting and receiving address information and data to be transferred;

a mode terminal for transmitting and receiving a mode signal indicative of whether a signal at said data terminal represents the address information or the data to be transmitted;

a read/write terminal for transmitting and receiving a read/write signal indicative of a timing for each of the signal at said data terminal and a signal at said mode terminal;

an input buffer and an output buffer each connected to said data terminal;

a data memory pointer connected to said internal data memory; and a control circuit connected to said mode terminal and to said read/write terminal, for data transmission, the method comprising the steps of:
  directing said data memory pointer to generate a read address to be given to said internal data memory based on address information for said internal data memory of an objective processor out of the plurality of processors, the address information being held in said input buffer, thereby reading data from said internal data memory, and directing said output buffer to hold the data that has been read;
  transmitting, in conjunction with said mode signal and in synchronization with said read/write signal, address information for the internal data memory of a cooperative processor out of the plurality of processors which information is held in said output buffer to said cooperative processor via said data terminal; and
  transmitting, in conjunction with said mode signal and in synchronization with said read/write signal, the data held in said output buffer to said cooperative processor via said data terminal, for data reception, the method comprising the steps of:
  receiving, in conjunction with said mode signal and in synchronization with said read/write signal, address information transmitted from said cooperative processor via said data terminal and directing said input buffer to hold the address information that has been received;
  receiving, in conjunction with said mode signal and in synchronization with said read/write signal, data transmitted from said cooperative processor via said data terminal and directing said input buffer to hold the data that has been received; and
  directing said data memory pointer to generate, based on the address information held in said input buffer, a write address to be given to said internal data memory and thereby writing the data held in said input buffer into said internal data memory.

* * * * *